(No Model.) 2 Sheets—Sheet 1.

L. SCHUTTE.
CHECK VALVE.

No. 328,979. Patented Oct. 27, 1885.

Attest.
Sidney P. Hollingsworth
Wm R. Kennedy

Inventor.
Louis Schutte
By P. T. Dodge.
Atty (No Model.) 2 Sheets—Sheet 2.
L. SCHUTTE.
CHECK VALVE.
No. 328,979. Patented Oct. 27, 1885.
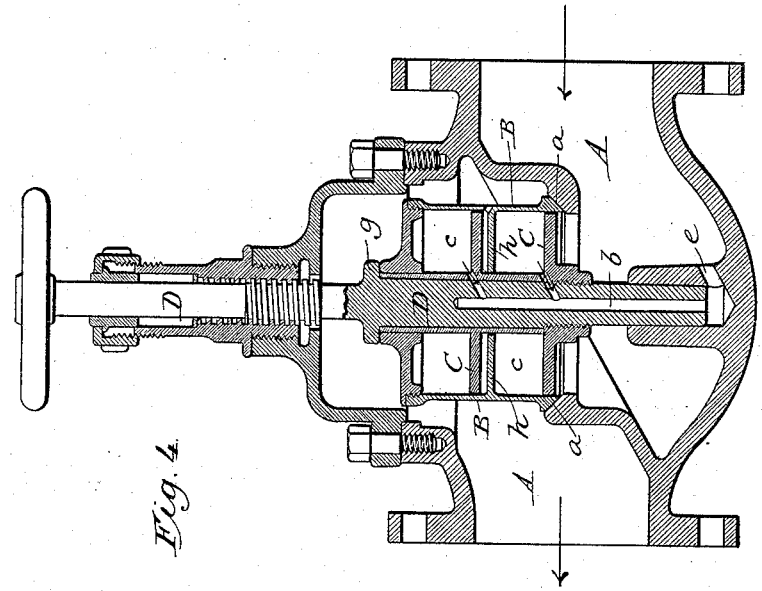
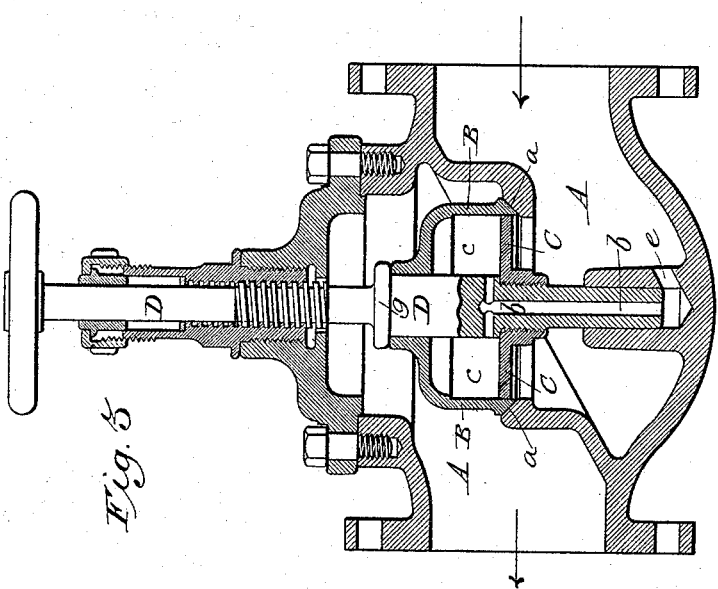
Attest.
Sidney P. Hollingsworth
Wm. R. Kennedy
Inventor
Louis Schutte
By his Atty
P. T. Dodge

UNITED STATES PATENT OFFICE.

LOUIS SCHUTTE, OF PHILADELPHIA, PENNSYLVANIA.

CHECK-VALVE.

SPECIFICATION forming part of Letters Patent No. 328,979, dated October 27, 1885.

Application filed August 24, 1885. Serial No. 175,218. (No model.)

*To all whom it may concern:*

Be it known that I, LOUIS SCHUTTE, of Philadelphia, in the county of Philadelphia and State of Pennsylvania, have invented certain Improvements in Check-Valves, of which the following is a specification.

This invention relates to check-valves such as are used to prevent a back-flow of liquids or fluids through pipes or conduits in which the flow is of varying strength or pressure.

It is the aim of the invention to provide a valve which shall not be affected by the variations in the current, but which shall remain open as long as the current is maintained in one direction, but instantly close when the current ceases, and which shall at the same time be adapted to work smoothly and easily. To this end I adopt a construction which admits to the under side of the valve a pressure sufficiently in excess of the pressure on its upper side to compensate for the weight of the valve.

Figure 2:
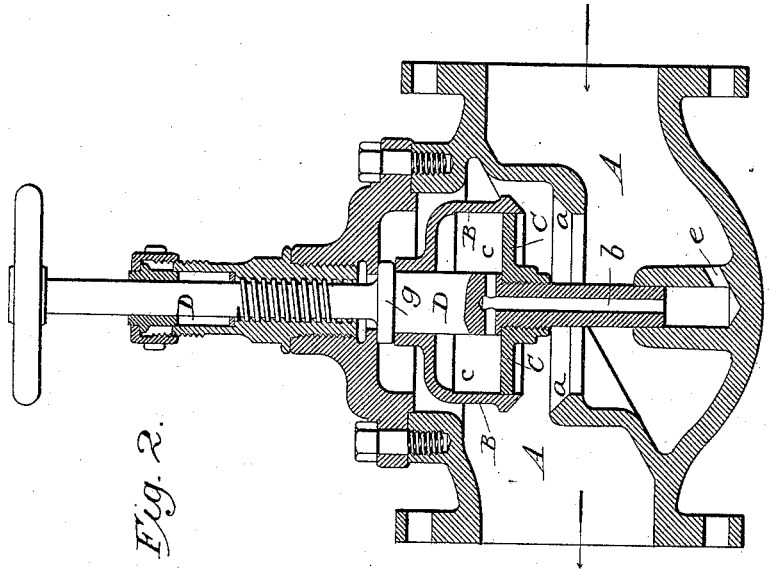
Figure 1:
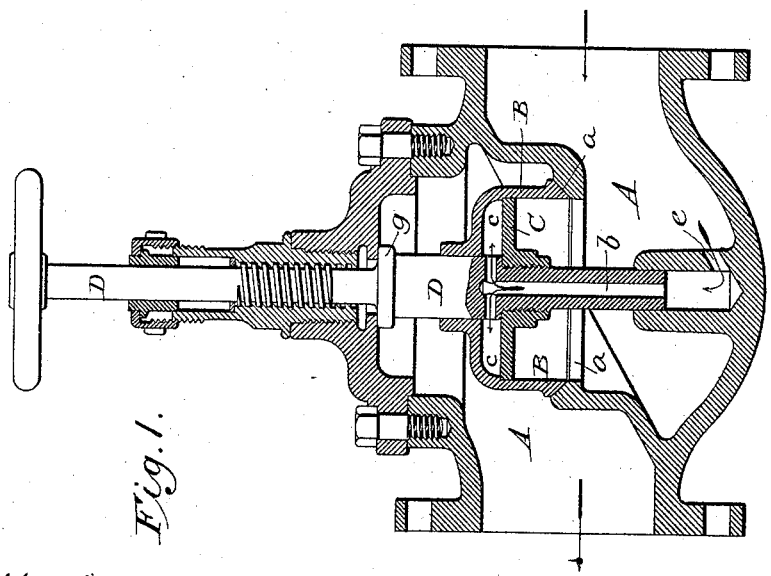

Referring to the accompanying drawings, Figures 1, 2, and 3 represent longitudinal vertical sections of my valve in its preferred form, the parts being shown in the different positions which they assume in practice. Fig. 4 is a similar view of the valve in a modified form.

In the drawings, A represents the body or shell of the valve, which may be similar to the body of an ordinary globe-valve, with inlet and outlet ports at opposite sides, separated by a transverse diaphragm containing a valve-seat or throat, $a$, as usual.

B is the valve proper, adapted to fit at its periphery closely upon the seat or throat, and constructed in the present instance of a bell form—that is to say, with a central chamber or cavity in its under side. Under ordinary conditions the valve is free to rise and fall so as to open and close the throat in the same manner as valves of the ordinary type.

Within the valve I mount a piston, C, which is designed to remain, under ordinary conditions, in a stationary position above the valve-seat, in order to confine the fluid which is admitted to the intermediate space or chamber, $c$, for the purpose of lifting the valve from its seat.

The piston C is secured to a vertical stem or spindle, D, which may be secured rigidly to the body of the valve, so as to render the piston immovable, or threaded, as shown, and extended outward through the top of the body, for a purpose which will presently appear. The lower end of the spindle, which is seated in a guide in the bottom of the shell, is provided with a hole or passage, $b$, which communicates at one end with the pressure-chamber $c$ within the valve, and at the other end through a passage, $e$, with the inlet-port of the body, so that the fluid entering the body may pass freely through the openings $e$ and $b$ into the space $c$ above the piston and beneath or within the valve proper. As shown in the drawings, the construction is such that the fluid-pressure within the chamber $c$ is sufficient to overcome the counter-pressure above the valve and lift the latter from its seat and maintain it in the elevated position as long as there is the slightest excess of pressure at the inlet side of the body; or, in other words, as long as there is the slightest current through the body toward the delivery side. The excess of pressure on the under side of the valve must be equal to or slightly greater than the weight of the valve, so that the lifting of the valve and its maintenance in the elevated position will be insured, while at the same time the slight difference in pressures will cause the valve to drop quickly but easily to its seat the moment that the current ceases.

It is sometimes desirable to hold the valve B upon its seat in order that the device may be used as a positive or stop valve. It is to this end that the spindle D is threaded so that it may be screwed upward and downward. When the spindle is in its upper position, the valve is free to slide upward and downward thereon to the required extent; but as the spindle is screwed downward the shoulder $g$ thereon bears on top of the valve, limiting the lifting motion of the valve; or, if sufficiently depressed, acting to hold the valve firmly to its seat. The rising and falling movement of the spindle has the effect of raising and lowering the piston C; but this is but an incident of the construction adopted, and is not necessary to the operation of the parts.

As regards the opening and closing of the valve, the piston C may be fixed rigidly in position in any suitable manner.

In the apparatus represented in Fig. 4 the internal space or chamber of the valve proper is divided by a partition, h, into two, an upper and a lower chamber, and the spindle provided with two pistons, C, located one in each chamber. The two chambers communicate through a central opening in the spindle with the inlet port of the body, as in the preceding example. The object of these double chambers is to reduce the difference in pressure between the upper and under sides of the valve to the minimum, a valve of this form being designed for use in those places in which a great difference in pressure between the upper and lower sides of the valves would be objectionable.

This form of valve is particularly advantageous in connection with the exhaust-pipe of steam-engines and similar places in which an excessive pressure may temporarily occur beneath the valve. This pressure, being admitted into the pressure-chamber, lifts the valve and keeps it in its raised position until the pressure in the chamber is permitted to dissipate, which does not occur until the pressure above and below the valve is nearly equalized.

By limiting the stroke of the valve by the adjustment of the spindle, the time occupied by the movement of the valve can be so regulated that the resupply of pressure will occur in time to maintain the excess below the valve, so as to keep the valve in an open position as long as there is the slightest current in a forward direction, while, on the other hand, the reversal of the current will cause the valve to close instantly.

The essence of the invention consists in the employment of the pressure-chamber and piston, or their mechanical equivalents, in connection with the valve, to control its rising and falling movement. The form of the pressure-chamber may be modified, and it may be located either above or below the valve in connection with a plate or piston attached to the valve-stem.

Having thus described my invention, what I claim is—

1. In combination with a valve-body and a check-valve therein, a fluid-pressure chamber located on the receiving side of the valve and communicating by a port or passage with the inlet side of the body, whereby the fluid in said chamber is applied to open the valve.

2. The body and the chambered check-valve therein, in combination with the fixed piston within the valve, and the port or passage of restricted area, forming a communication between the valve-chamber and the inlet-port.

3. A check-valve protected on its receiving side by a piston or diaphragm from the direct action of the inflowing current, but communicating therewith by a passage of relatively small area, whereby the force of the inflowing fluid is applied gradually to effect the opening of the valve.

4. In combination with the body, the valve, and the piston, the adjustable spindle secured to the piston and provided with a shoulder to limit the motion of the valve.

5. In a check-valve, the combination of a body, a check-valve communicating on its delivery side with the delivery-port of the body, and a chamber, substantially as described, for confining and applying the fluid-pressure on the receiving side of the valve, said chamber having a communication of relatively small area with the receiving side of the body, whereby the inflowing fluid is delivered to effect the opening of the valve and to retard its closing action against the counter-pressure on the opposite side.

In testimony whereof I hereunto set my hand this 31st day of July, 1885, in the presence of two attesting witnesses.

LOUIS SCHUTTE.

Witnesses:
    DANL. HILDRETH,
    FRANK SPILLIN.